Patented Aug. 6, 1929.

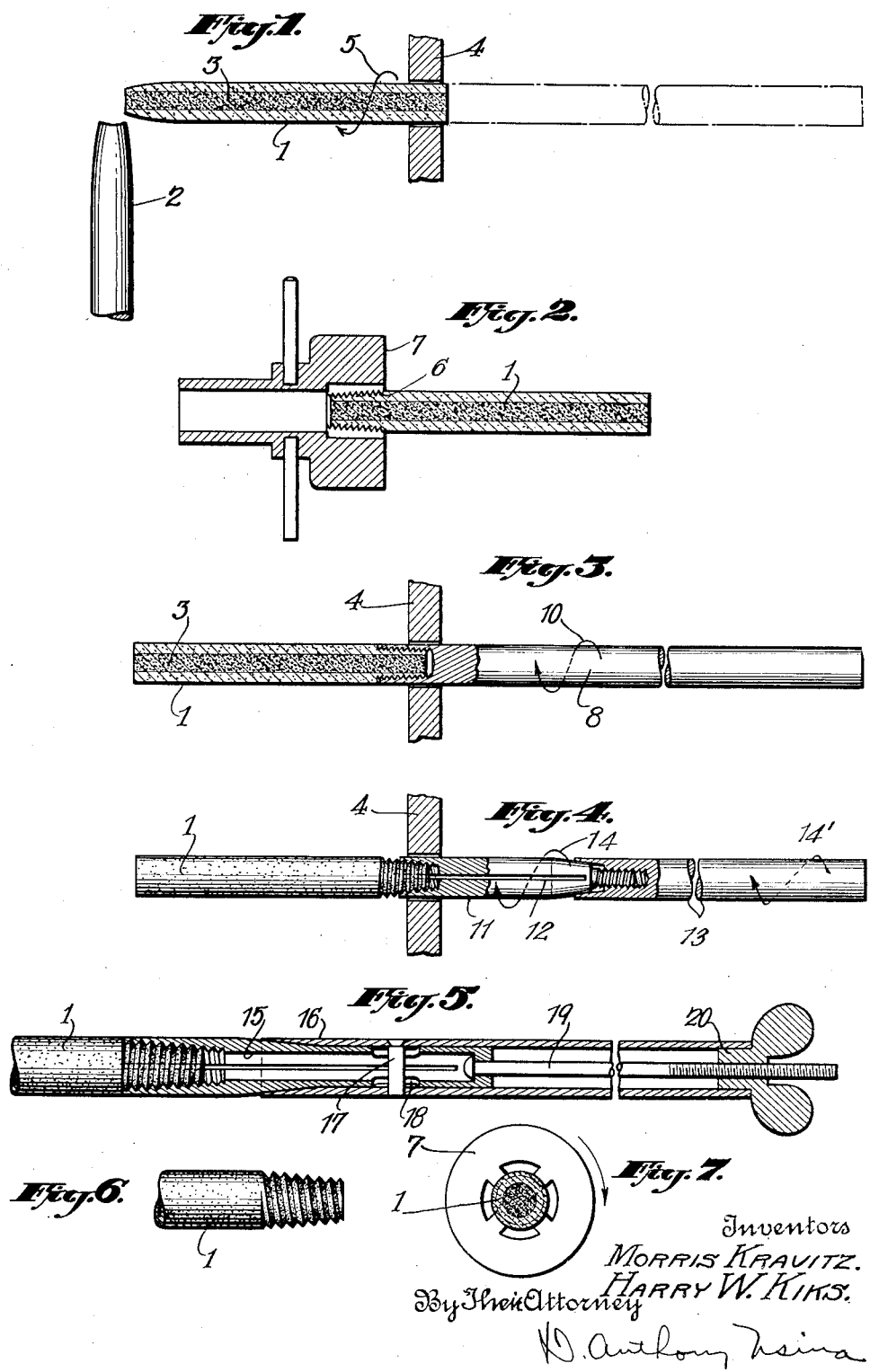

1,723,626

UNITED STATES PATENT OFFICE.

MORRIS KRAVITZ AND HARRY W. KIKS, OF BROOKLYN, NEW YORK.

CARBON SAVER.

Application filed February 5, 1927. Serial No. 166,032.

In high intensity projection lamps for moving pictures, the horizontal electrode is fed toward gradually and turned on its axis. The feeding mechanism is located some distance back of the arc. There is ordinarily a considerable fraction of this electrode which cannot be fed further by the mechanism and which is wasted. Our invention provides means for saving this ordinarily unused portion of the electrode. The accompanying drawings illustrate embodiments of the invention.

Fig. 1 is a side elevation of the electrodes with the horizontal electrode burned off to about the usual limit;

Fig. 2 is a side elevation of the portion of electrode left in Fig. 1 threaded to adapt it to our saving device;

Figs. 3, 4 and 5 are side elevations similar to Fig. 1 showing the carbon saver in different forms;

Fig. 6 is a detail view showing the soft burnt end of an electrode threaded according to our invention;

Fig. 7 is an end view showing a die and an electrode being threaded thereby.

Carbons 1 and 2 generally have a soft core 3 for producing an arc of high intensity. The stiff carbon, therefore, is only a shell. The horizontal carbon 1 is held in a clamp indicated diagrammatically at 4 and fed forward slowly as it burns away at the end in the rotary direction indicated by the arrow 5. The electrode or carbon is usually about twenty-four inches in length. When it is consumed until about six inches are left, this remaining length is all projecting beyond the feeding mechanism 4 and, of course, can not be fed farther directly by the machine.

We take this stub end 1 and form a screw thread on the soft tapered end 6 thereof. For this purpose we may use an under cutting die 7 the material being soft enough to be easily threaded with such a die. It will be understood that this material at the end near the arc has been considerably softened by the heat; otherwise, it would not be possible to form a thread thereon without breaking the thin shell of carbon which surrounds the soft core. Previous efforts to save the butt ends of such carbon have worked on the rear unburned ends, which are much harder to cut, and have involved methods which could not be applied to the soft burned end without breaking the shell.

The taper threaded end 6 is then introduced into the end of a rod of the same diameter as the carbon and forming a continuation of the latter so as to be fed through by the feeding mechanism 4 until practically the entire carbon is consumed. The rod may be made in one or more pieces as indicated in the different views. Fig. 3 shows a simple rod 8 of metal resistent to high temperature, having a threaded socket 9 fitting the threaded end 6 of the carbon. The threads work in the direction shown by the arrow 10 so that when the rod is turned in this direction by the feeding means 4, it will continue to hold and to advance the carbon. It is important to maintain a good grip on the carbon and one which will hold it in correct alignment so that the arc will be held steady while the electrode rotates; which means that the axis of the piece of electrode must be held rigidly and fairly accurately in line with the axis of the rod 8. This is accomplished by the threaded engagement described and by the use of a threaded end and socket of substantial length. There can be no wobbling of the electrode in the end of the rod. Instead of making the rod of a single piece, the portion of it adjacent to the electrode may be made of metal high resistent to heat and an additional section of softer metal applied to the rear end of it.

According to Fig. 4 the rod is in two parts. A front portion 11 is split as at 12, the ends are also threaded for engagement with the end 6 of the electrode. The rear end of this piece 11 has a threaded engagement with an extension 13 such that when the latter is screwed forward it pinches the split clamp 11 together so as to hold the electrode firmly. The arrows 14 and 14' show the rotation and advance of two parts; by which the electrode is held firmly while it is advanced.

According to Fig. 5 the forward part of the rod is a split section 15, similar to the part 11 in Fig. 4. Its rear cylinder end slides in a tubular extension 16 which carries a pin 17 passing through slots 18 in the rear portion of the split socket. A rod 19 engages the rear end of this split socket and is threaded through a thumb nut 20 in the rear end of the extension 16. By this thumb nut the split socket can be clamped firmly on the electrode.

Various modifications may be made by those skilled in the art without departure from the invention as defined in the following claims.

What we claim is:—

1. A method of saving soft-cored carbons of high-intensity projection apparatus which consists in threading the burned ends of pieces too short to be fed directly by the machine and fastening on the threaded end a rod of the same diameter as the carbon and feeding the rod by turning it in the forward direction of the thread.

2. In combination with a soft cored carbon electrode consisting of the part remaining after the electrode has been partly burned away, a metallic extension member of the same diameter as said electrode and having an internally threaded socket engaging threads formed on the soft burned end of the electrode.

In witness whereof, we have hereunto signed our names.

MORRIS KRAVITZ.
HARRY W. KIKS.